United States Patent [19]
Ellis

[11] Patent Number: 5,351,433
[45] Date of Patent: Oct. 4, 1994

[54] FISHING LURE

[75] Inventor: John Ellis, Cobram, Australia

[73] Assignee: Mary Ellis, Cobram, Australia

[21] Appl. No.: 4,891

[22] Filed: Jan. 21, 1993

[30] Foreign Application Priority Data

Feb. 18, 1992 [AU] Australia .................. PL0918/92

[51] Int. Cl.⁵ ............................................. A01K 85/00
[52] U.S. Cl. .................................. 43/42.22; 43/42.47
[58] Field of Search ................ 43/42.09, 42.22, 42.47

[56] References Cited

U.S. PATENT DOCUMENTS

| | | | |
|---|---|---|---|
| 2,494,384 | 1/1950 | Gadzinski | 43/42.22 |
| 3,205,609 | 9/1965 | Knapton | 43/42.22 |
| 4,215,507 | 8/1980 | Russell | 43/42.47 |
| 4,697,378 | 10/1987 | Tunstall | 43/42.22 |
| 4,777,761 | 10/1988 | Renaud | 43/42.47 |
| 4,807,387 | 2/1989 | Dougherty | 43/42.22 |
| 4,944,112 | 7/1990 | Garmany | 43/42.22 |

FOREIGN PATENT DOCUMENTS

| | | | |
|---|---|---|---|
| 28367 | 1/1988 | Australia . | |
| 42155 | 8/1969 | Finland | 43/42.09 |
| 90/00243 | 6/1990 | PCT Int'l Appl. . | |
| 906089 | 9/1962 | United Kingdom | 43/42.09 |

*Primary Examiner*—Kurt C. Rowan
*Attorney, Agent, or Firm*—Knobbe, Martens, Olson & Bear

[57] ABSTRACT

A fishing lure has a body with a replaceable bib mounted by releasable locking means within a slot at its forward end. The bib can thereby be replaced by a bib which provides different depth characteristics for the lure.

3 Claims, 2 Drawing Sheets

FISHING LURE

BACKGROUND OF THE INVENTION (1) Field of the Invention

The present invention relates to a fishing lure.

(2) Description of the Prior Art

Fishing lures conventionally comprise a buoyant body with a plate or bib extending from the front of the body. The body has one or more mounting points for hooks and also for attachment to a fishing line. The body itself is of a generally streamlined shape and the shape of the bib in conjunction with the buoyancy of the body is such that when the lure is towed through the water it will ride at a predetermined depth. A different riding depth is required for catching different types of fish and, conventionally, a different lure is usually sold for different depths of operation.

There have been proposed lures in which the bib is adjustably mounted relative to the body in order to provide an adjustable depth of operation, but these prior proposals have not provided a satisfactory adjustable mounting for the bib. Examples of previously proposed lures in which the bib is adjustably mounted are disclosed in Australian patent applications AU-A-28367/84 and AU-A-57349/90.

SUMMARY OF THE INVENTION

According to the present invention there is provided a fishing lure comprising a body having means for attachment to a fishing line, a bib extending forwardly of the body and mounted in a forwardly-open slot at the front end portion of the body, and releasable locking means for releasably locking the bib within the slot whereby to permit replacement of the bib.

Preferably, the releasable locking means operates with a snap-type action preferably formed by a resilient part of the bib.

Preferably, the interior of the slot includes a longitudinally-projecting rib which engages within a longitudinal slot opening onto a rear end edge of the bib.

The invention also provides a fishing lure as defined above in combination with a set of said bibs, respective bibs of the set having a configuration which provides a different depth of travel of the lure.

BRIEF DESCRIPTION OF THE DRAWINGS

An embodiment of the invention will now be described by way of example only with reference to the accompanying drawings in which.

DESCRIPTION OF THE PEERED EMBODIMENTS

Figure 1:
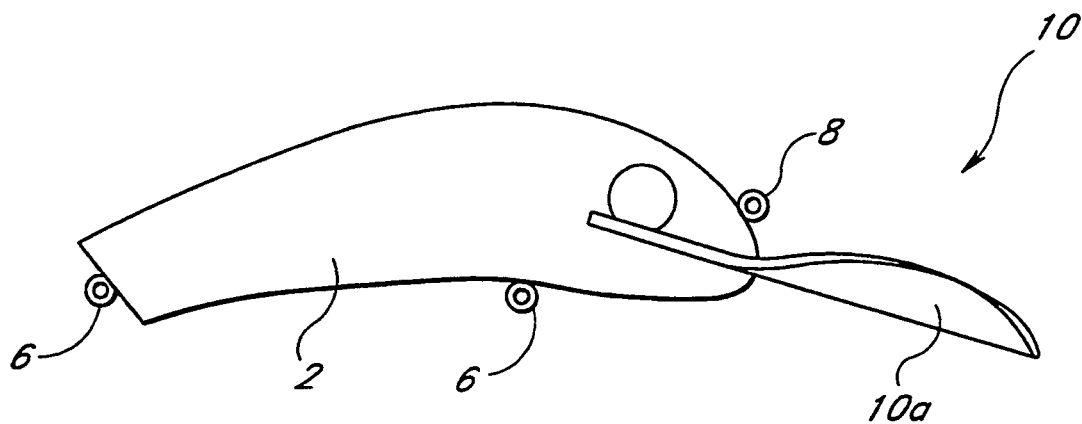
FIG. 1 is a side view of a lure in accordance with the preferred embodiment of the invention.
Figure 4:
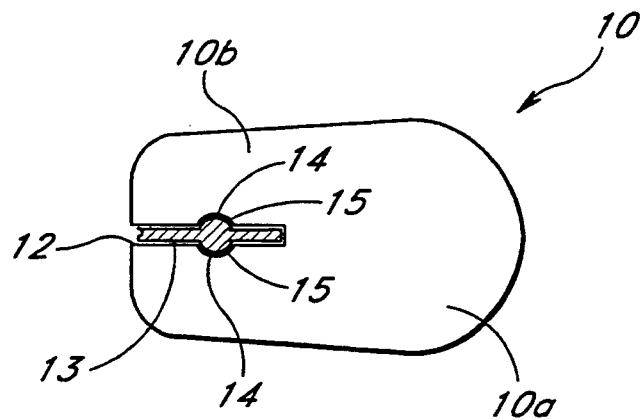
FIG. 4 is a plan view of the bib and a sectional view of a rib disposed in a slot at the forward end of the body, showing the cooperation between outwardly extending projections on the rib and the bib slot.
Figure 2:
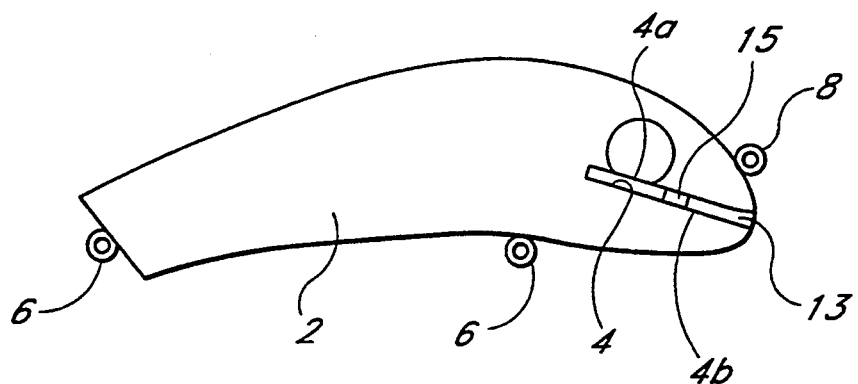
FIG. 2 is a side view of a body of the lure.
Figure 3:
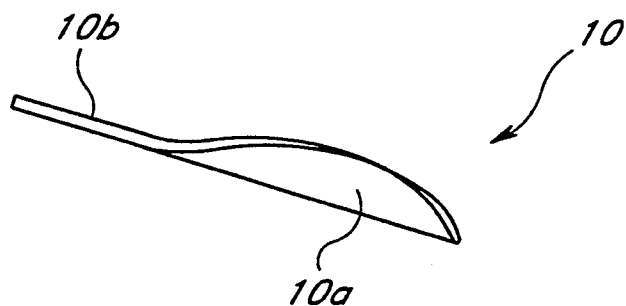
FIG. 3 is a side view of a removable bib of the lure.

As shown in the accompanying drawings a bib in accordance with a preferred embodiment of the invention comprises a body 2 having at its front end portion a forwardly-opening slot 4. The body 2, which may or may not be a buoyant body, is a relatively streamlined shape and has eyes 6 for attachment to hooks and also an eye 8 at its forward end for attachment to a fishing line. A bib 10 is releasably secured within the slot 4 and a forward portion 10a of the bib 10 extends forwardly of the body 2 and is shaped to cause the lure to travel through the water at a predetermined depth. The bib 10 is replaceable within the slot 4 by one of a number of other bibs having differently-shaped forward portions which provide a different riding depth of the lure through the water.

The slot 4 in the body 2 has substantially parallel upper and lower walls 4a, 4b and the bib 10 has, rearwardly of its shaped forward portion 10a, a mounting portion 10b of planar form which fits tightly within the slot 4 so that upper and lower surfaces of the mounting portion 10b are in firm engagement with the upper and lower walls 4a, 4b of the slot 4. The interior of the slot 4 and the mounting portion 10b of the bib 10 comprise interengageable locking means which releasably engage with a snap or detent action whereby the mounting portion 10b is positively locked within the slot 4 but which can be released to permit removal of the bib 10. The releasable locking means can take different forms and can comprise a resilient locking component on the mounting portion of the bib engageable with an element within the slot and which itself may be resilient or rigid. An alternative configuration is also possible in which the mounting element within the slot 4 is resilient, and the mounting portion 10b of the bib 10 is rigid. However, in the preferred embodiment as illustrated, it is preferred that the bib 10 is formed from a semi-rigid material, for example a suitable plastics, so that the bib 10 has a limited degree of flexibility. The mounting portion 10b of the bib 10 is formed with a slot 12 extending longitudinally from its rear end. The interior of the slot 4 in the body 2 includes a longitudinally-extending rib 13 which engages within the slot 12 when the mounting portion 10b of the bib 10 is inserted rearwardly into the slot 4 in the body 2. The slot 12 in the mounting portion 10b of the bib 10 comprises opposed recesses 14 into which opposed projections or detents 15 on the side of the rib 13 can engage with a snap action by deflection of the side walls of the slot 12 when the mounting portion 10b is moved rearwardly along the rib. The locking effect thereby achieved is sufficient to positively lock the bib 10 within the slot 4, but nevertheless the bib 10 can still be removed when the forward portion 10a of the bib 10 is deliberately flexed and a forwards force is applied to the bib 10 to withdraw the bib 10 from the slot 4 in the body 2. It will be appreciated that the number of and configuration of the recesses 14 along the opposed sides of the slot 12 in the mounting portion 10b and the corresponding projections on the rib may be different from that specifically illustrated, and the recess(es) may be formed on the rib with the projection(s) being formed on the sides of the slot 12. The cooperation between the rib and the longitudinal slot 12 in the mounting portion 10b of the bib 10 ensures that the bib 10 is firmly located relative to the body 2 and that accidental displacement of the bib 10 relative to the body 2 cannot take place. However, the bib 10 can still be easily removed from the body 2 and replaced by another bib having characteristics which will cause the lure to ride at a different depth.

The lure can be supplied with a set of bibs providing different depth characteristics. The removable mounting of the bibs is also of advantage as a bib may readily be replaced if the bib becomes broken as a result of the lure becoming tangled with submerged logs or rocks.

The slot 4 in the body 2 may be directed at a different inclination from that specifically illustrated and, in order to provide a greater range of depth variation, the body may comprise two or more similar slots 4 arranged at different angles of inclination.

The embodiment has been described by way of example only and modifications are possible within the scope of the invention.

I claim:

1. A fishing lure comprising:
   a body having a front end portion and sides, the front end portion of the body including a slot which extends rearwardly, said slot being open to the front of the body and being open to the sides of the body,
   a rib extending longitudinally in said slot, and
   a bib having a rear mounting portion releasably receivable within said slot and a forward portion shaped to cause the lure, when in use, to ride at a predetermined depth in the water, said rear mounting portion being of plate-like form and having a slot extending forwardly from a rear edge of the mounting portion, said slot in the mounting portion dividing said portion into two opposed wings having opposed inner edges defining the opposed sides of the slot,
   whereby the slot in the mounting portion receives the rib when the mounting portion of the bib is moved rearwardly into the slot in the body, said bib being composed of a semi-rigid material whereby the wings are capable of limited flexing, the rib and the inner edges of the wings having interengageable formations which interlock by outward deformation of the wings when the mounting portion is pushed into said slot in the body whereby to lock the mounting portion in said slot, the mounting portion being releasable to permit withdrawal by flexing the forward portion of the bib, and
   means for attachment of the body to a fishing line.

2. A fishing lure according to claim 1, wherein one of said mounting portion slot and said rib includes a locking recess and the other of said mounting portion slot and said rib includes a locking detent, the locking recess and locking detent being engageable with a snap action when the bib is inserted into the slot in the body.

3. A fishing lure according to claim 1, in combination with a set of said bibs, wherein each respective bib of the set has a configuration which provides different depths of travel of the lure.

* * * * *